United States Patent
Griffin et al.

(10) Patent No.: US 12,058,235 B1
(45) Date of Patent: Aug. 6, 2024

(54) DOUBLY LINKED BLOCKCHAIN

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 614 days.

(21) Appl. No.: 17/065,212

(22) Filed: Oct. 7, 2020

Related U.S. Application Data (62) Division of application No. 15/498,395, filed on Apr. 26, 2017, now Pat. No. 10,805,067.

(51) Int. Cl.
| | |
|---|---|
| *H04L 9/06* | (2006.01) |
| *H04L 9/14* | (2006.01) |
| *H04L 9/30* | (2006.01) |
| *H04L 9/32* | (2006.01) |

(52) U.S. Cl.
CPC .......... *H04L 9/0637* (2013.01); *H04L 9/0643* (2013.01); *H04L 9/14* (2013.01); *H04L 9/30* (2013.01); *H04L 9/3247* (2013.01)

(58) Field of Classification Search
CPC . H04L 9/0637; H04L 9/14; H04L 9/30; H04L 9/3247; H04L 9/0643
See application file for complete search history.

(56) References Cited

U.S. PATENT DOCUMENTS

| | | | |
|---|---|---|---|
| 2016/0028552 A1* | 1/2016 | Spanos | H04L 9/3268 713/178 |
| 2016/0203496 A1 | 7/2016 | Guerrero et al. | |
| 2017/0346639 A1 | 11/2017 | Muftic | |

OTHER PUBLICATIONS

Kokoris-Kogias et al., "Managing Identities Using Blockchains and CoSi", infoscience.epfl.ch, with people.epfl.ch/linus.gasser showing a date of Jul. 22, 2016 for this document, 2 pages (Year: 2016).*
Kokoris-Kogias et al., slideshow for "Managing Identifies Using Blockchains and CoSi", Jul. 22, 2016, obtained from https://gasser.blue/Files/HotPets2016.pdf, 26 pages (Year: 2016).*

(Continued)

*Primary Examiner* — Jeffrey D. Popham
(74) *Attorney, Agent, or Firm* — Foley & Lardner LLP (57) ABSTRACT

An example method includes accessing a first block of a first blockchain, the first block comprising first block content; generating an intermediate first block, the intermediate first block comprising the first block of the first blockchain; accessing a second block of the first blockchain, the second block comprising a first backward link comprising a hash of the first block of the first blockchain, and second block content; generating a first forward link comprising a hash of the second block of the first blockchain; generating a first prime block, the first prime block comprising the intermediate first block, and the first forward link; and digitally signing the first block using SignedData cryptographic message syntax to generate a first SignedData message, wherein digitally signing comprises binding the first forward link to the first SignedData message via an attribute of the first SignedData message.

20 Claims, 4 Drawing Sheets

(56) References Cited

OTHER PUBLICATIONS

Gasser, Linus, "Managing Identities Using Blockchains and CoSi", video of presentation provided on Jul. 22, 2016, found on YouTube at https://www.youtube.com/watch?v=b9OV_vCsEzo (Year: 2016).*

Nakamoto, Satoshi, "Bitcoin: A Peer-to-Peer Electronic Cash System", 2008, pp. 1-9 (Year: 2008).*

E. Syta et al. Keeping Authorities "Honest or Bust" with Decentralized Witness Cosigning. In 37th IEEE Symposium on Security and Privacy (Year: 2016).*

R. Housely, "Cryptographic Message Syntax (CMS)", RFC 5652, Sep. 2009, pp. 1-56 (Year: 2009).*

E. Syta et al., Keeping Authorities "Honest or Bust" with Decentralized Witness Cosigning. In 37th IEEE Symposium on Security and Privacy, 2016. 20 pages.

Gasser, Linus, "Managing Identities Using Blockchains and CoSi", video of presentation provided Jul. 22, 2019, found on YouTube at https://www.youtube.com/watch?v=b9OV_vCsEzo (Year: 2016).

ISO/IEC JTC 1/SC 27, Text for ISO/IEC DIS 19592-2—Information technology—Security techniques—Secret sharing—Part 2: Fundamental mechanisms, May 17, 2016. 36 pages.

ISO/IEC JTC 1/SC 27, Text for ISO/IEC FDIS 19592-1—Information Technology—Security Techniques—Secret sharing—Part 1: General, Jun. 22, 2016. 18 pages.

Kokoris-Kogias et al., "Managing Identities Using Blockchains and CoSi", infoscience.epfl.ch, 2016. 2 pages.

Kokoris-Kogias et al., slideshow for "Managing Identities Using Blockchains and CoSi", Jul. 22, 2016, obtained from https://gasser.blue/Files/HotPets2016.pdf, 26 pages (Year 2016).

Korkois_Kogias et al., "Managing Identities Using Blockchains and CoSi", infoscience.epfl.ch, with people.epfl.ch/linus.gasser showing a date of Jul. 22, 2016 for this documents, 2 pages (Year 2016).

Longo et al., "On the security of the Blockchain Bix Protocol and Certificates", University of Trento, Jul. 29, 2016. 16 pages.

* cited by examiner

DOUBLY LINKED BLOCKCHAIN

CROSS-REFERENCE TO RELATED APPLICATIONS

This application is a divisional of U.S. patent application Ser. No. 15/498,395 filed Apr. 26, 2017, titled "DOUBLY LINKED BLOCKCHAIN," which is hereby incorporated by reference in their entireties.

BACKGROUND

A blockchain is a distributed database or a distributed ledger whose beneficial attributes include permanency and security. Currently, blockchains tend to be singly linked lists or chains using backward pointers (e.g., hash or message digest) as the next block is unknown and does not yet exist. Every blockchain has a genesis block (the first block) and a current block (the last block), with a plurality of blocks between the genesis block and current block. Each block contains the hash of its preceding block and a hash of its own content. Because every block contains the hash of its preceding block, and the current block contains the hash of its own content, the data integrity of each block, and therefore the data integrity of the whole blockchain, can be validated. Blockchain validation begins at the current block, with the hash values for the current block and preceding blocks verified until the genesis block is verified. Accordingly, regular blockchains can only be "walked backwards" from the current block to the genesis block, meaning that every block needs to be individually verified for the overall blockchain to be validated. Because new blocks are constantly being added to the blockchain, the whole blockchain needs to be re-validated upon adding another "current" block. Further, a block in the blockchain points only to the previous block (which in turn points to a previous block) until a genesis block is reached. Therefore, while an entity can verify that the hash in the second block is indeed the hash of the first block, there is no pointer information to locate where future blocks are located. Additionally, despite industry claims, regular blockchains are in fact not completely immutable because the block data can be modified and the hash can be recomputed. The claimed immutability is partially based on the computational infeasibility of finding a hash collision that allows a block to be changed without affecting the links, and that multiple users copies of the entire blockchain can be compared to detect any differences. However, with sufficient computational capability the whole or partial blockchain could be replaced depending on where within the blockchain the high-jacking occurs. Thus, blockchain integrity is at best a level of assurance that changes to the blockchain can be detected, and not completely immutable as claimed.

SUMMARY

Various embodiments relate to a method performed by a processor of a computing system. An example method includes accessing a first block of a first blockchain. The first blockchain has first block content. A second block of the first blockchain is accessed. The second block includes a first backward link including a hash of the first block and a second block content. A first prime block is generated. The first prime block includes the first block and a first forward link. The first forward link includes a hash of the second block of the first blockchain. The first prime block is published on a doubly linked blockchain. A third block of the first blockchain is accessed. The third block includes a second backward link including a hash of the second block and a third block content. An intermediate second block is generated. The intermediate second block includes a first prime backward comprising a hash of the first prime block of the doubly linked blockchain and the second block of the first blockchain. A first prime block is generated. The first prime block includes the intermediate second block and a second forward link comprising a hash of the third block of the first blockchain. The second prime block is published to the doubly linked blockchain. The doubly linked blockchain can be walked either forwards or backwards to perform partial or full validation of the doubly linked blockchain.

Various other embodiments relate to a method performed by a processor of a computing system. An example method includes accessing a first block of a first blockchain. The first blockchain has first block content. A second block of the first blockchain is accessed. The second block includes a first backward link including a hash of the first block and a second block content. A first forward link is generated. The first forward link includes a hash of the second block of the first blockchain. The first block and the first forward link are digitally signed with a private key. The origin authenticity of the second prime block can be determined by using the public key of a public/private key pair that includes the private key. A third block of the first blockchain is accessed. The third block includes a second backward link including a hash of the second block and a third block content. A first prime backward link is generated. The second prime backward link comprises a hash of the first prime block of the doubly linked blockchain. A second forward link is generated. The second forward link comprises a hash of the third block of the first blockchain. The second block, the second forward link, and the first prime backward link are digitally signed with the private key. The origin authenticity of the second prime block can be determined by using the public key of a public/private key pair that includes the private key.

Various other embodiments relate to a method performed by a processor of a computing system. An example method includes accessing a first block of a first blockchain. The first blockchain has first block content. A second block of the first blockchain is accessed. The second block includes a first backward link including a hash of the first block and a second block content. A first forward link is generated. The first forward link includes a hash of the second block of the first blockchain. The first block is digitally signed using SignedData cryptographic message syntax to generate a first SignedData message. The first SignedData message includes binding the first forward link comprising a hash of the second block of the first blockchain to the first SignedData message via an attribute of the first SignedData message. A third block of the first blockchain is accessed. The third block includes a second backward link including a hash of the second block and a third block content. An intermediate second block is generated. The intermediate second block includes a first prime backward comprising a hash of the first prime block of the doubly linked blockchain and the second block of the first blockchain. The intermediate second block is digitally signed using SignedData cryptographic message syntax to generate a second SignedData message. The second SignedData message includes binding the second forward link comprising a hash of the third block of the first blockchain to the first SignedData message via an attribute of the first SignedData message.

These and other features, together with the organization and manner of operation thereof, will become apparent from the following detailed description when taken in conjunction

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Under current blockchain ecosystems, a regular singly linked blockchain can be read starting with the current block backwards until the desired data is found or the genesis block is reached (e.g., like legacy data tapes). Locating, downloading, and validating the entire blockchain as currently structured takes effort, time, and computational resources. Accordingly, it would be advantageous and more efficient to have the ability to walk a blockchain both forwards and backwards. However, forward links are not currently available because when a block is written to a blockchain, the next block does not exist, so its hash cannot be computed and used as a forward link in the blockchain. Various embodiments described herein relate to systems and methods for generating a doubly linked blockchain. The doubly linked blockchain is generated in parallel to a singly (backwards) linked traditional blockchain. Unlike the traditional blockchain structure, the doubly linked blockchain system can be walked forwards or backwards for performing full or partial blockchain validation to gain a relative level of assurance of the blockchain integrity. Under the doubly linked blockchain system, when the next block becomes available, the previous block can be appended (as used herein, "appended" includes appended, prepended, altered, and other similar transformations) with a forward link without disrupting the backward links.

The doubly linked blockchain system preserves the original blockchain (e.g., does not break the chain) by utilizing a second parallel blockchain (e.g., a doubly linked blockchain) to store blocks from the original blockchain, which are appended with forward links in addition to the backward links. Generally, the doubly linked blockchain is generated by walking the original blockchain in one direction and building up the double links as the blocks are published. Upon completion, the blockchain is walked a second time to re-verify each block on the doubly linked blockchain and re-establish the old links to the new links. As will be appreciated, the doubly linked blockchain system is backwards compatible or, in other words, applicable to any blockchain using the traditional structure of backwards-only links. Additionally, the doubly linked blockchain may be used in parallel to the traditional blockchain structure. In some arrangements, the forward links are to a location of the new digitally signed block, for example a Uniform Resource Locator ("URL"). In those arrangements, the URL can be added a block and signed before the next, new block exists. Once the next new block exists, it is stored in the URL or location and is accessible (and linked) through the forward link.

The doubly linked blockchain system provides technical solutions to computer- and internet-centric problems associated with conventional blockchain systems. According to various arrangements, the doubly linked blockchain provides a more efficient and effective distributed ledger mechanism to the industry by providing a blockchain that can be walked forwards or backwards. With a conventional singly linked blockchain, the blockchain is read backwards starting with the current block until the data is found. The doubly linked blockchain system provides the ability to walk a blockchain forward or backwards, thereby increasing data search speed and allowing easier analyzation (e.g., transaction forensics) of the data on the blockchain. Additionally, the doubly linked blockchain system can be walked forwards or backwards to perform full or partial blockchain validation and provide a relative level of assurance of the blockchain integrity. Covering both extremes, some conventional applications assume blockchain integrity—which removes self-assurance—while others re-validate the blockchain in its entirety—which is costly and time consuming. The doubly linked blockchain system provides a middle ground solution through the ability to achieve partial (e.g., localized) validation.

The doubly linked blockchain system allows for seamless transitions in a blockchain system from a conventional singly linked system to a doubly linked system. In this regard, the doubly linked blockchain system is backward compatible and provides dual assurance and integrity, as both the doubly linked blockchain and the original blockchain can be validated. By preserving the cryptographic links, original data, pointers, etc., in the original blockchain, the doubly linked blockchain preserves the chain of evidence while providing superior blockchain structure and functionality. The doubly linked blockchain system allows for the generation of a doubly linked blockchain at any time in the lifecycle of a singly linked blockchain or from the inception of a new blockchain.

The technical problems solved by the doubly linked blockchain system arise out of the use of computers and the Internet because the online communications, transactions, and payment services cannot exist without the use of computers and the Internet. Accordingly, problems relating to authenticating content providers and signing parties arise out of the use of computers and the Internet. In addition, the inability to properly authenticate a user in an online communication cannot exist outside of computers and the Internet.

Figure 1A:
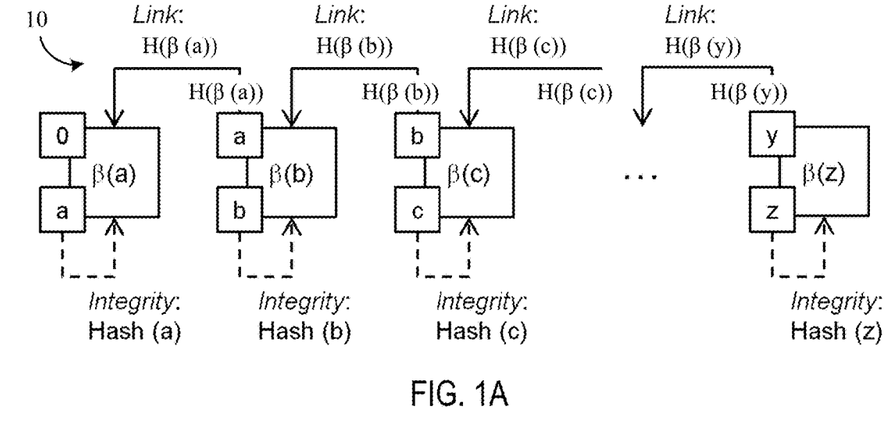
FIG. 1A is a functional block diagram of a singly linked blockchain, according to an example embodiment.

Referring to FIG. 1A, a functional block diagram of a singly linked blockchain is shown, according to an example embodiment. Generally, the singly linked blockchain 10 is a conventional, backward-linked blockchain. Each block includes a block identifier, an internal hash tree, block content, and a backward link that is a hash of the previous block.

As shown in FIG. 1A, each block in the blockchain 10 is denoted sequentially as β(a), β(b), β(c), and so on to β(z). The blockchain 10 has a genesis block, β(a), and a current (e.g., last) block, β(z). As will be appreciated and is illustrated below, any block in the middle of the chain can be expressed as β(n), where its predecessor is β(n−1) and its successor is β(n+1).

$$\beta(a) \leftarrow \beta(b) \leftarrow \beta(c) \ldots \beta(n-1) \leftarrow \beta(n) \leftarrow \beta(n+1) \ldots \beta(z)$$

The left arrows represent the backward link, which is the hash of the previous block. The β(b) link to β(a) is the hash of β(a), denoted H(β(a)). Similarly, the β(c) link to β(b) is H(β(b)), and so on. Since any block β(n) contains the hash of its previous block β(n−1), and that block contains the hash of its previous block β(n−2), and so on, the data integrity of each block, and therefore the whole blockchain 10, can be validated. Blockchain validation begins at the current block β(z), and the hash values for each block are verified until the genesis block β(a) is verified.

Each block includes the backward link, the internal hash tree, and the block data. As discussed above, the backward link is the hash of the previous block. The internal hash tree comprises the hashes of the block data, denoted H(data) or H(a:data), H(b:data), and H(c:data). The data can be anything, such as digitally signed financial transactions. The hash (a) within same block β(a) provides an integrity check. The H(β(a)) within the next block β(b) is used as a backward link to block β(a). The backward link does not provide block location because the processor needs to "know" where blocks are located. Chain immutability is based on H(β(a)) in block β(b), and the whole chain must be "walked" and hashes verified to evaluate immutability.

$$\beta(a)=\beta(a: \text{backward link,internal hash tree,data})$$

$$\beta(b)=\beta(b: H(\beta(a)), H(b:\text{data}),\text{data})$$

$$\beta(c)=\beta(c: H(\beta(b)), H(c:\text{data}),\text{data})$$

As will be apparent, singly linked blockchains make it difficult to locate the next blocks given a block at random, for example β(c). In order to locate the subsequent block, the blockchain 10 must be assembled starting at last known block β(z) and walked backwards. Once re-assembled, the blockchain 10 can only be processed or validated by working backwards from the most recently published block. This process becomes cumbersome and processor intensive with larger blockchains or when examining dozens or hundreds of chains.

Figure 1B:
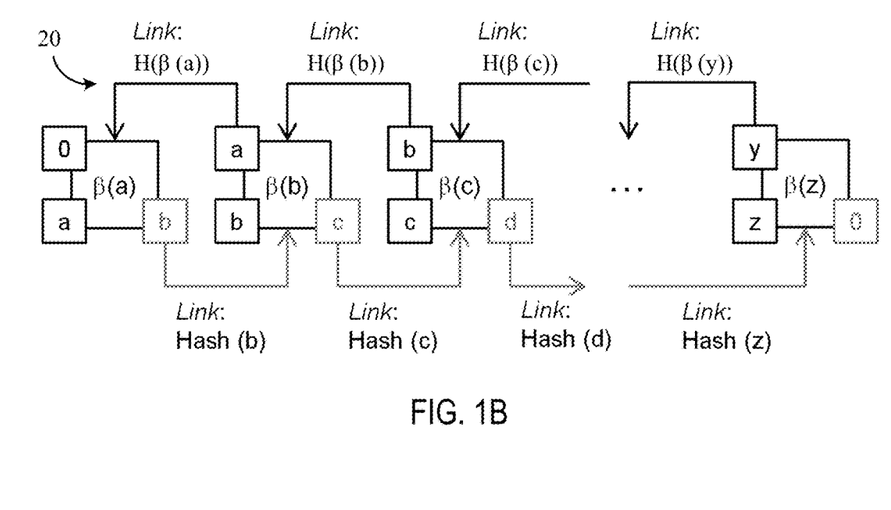
FIG. 1B is a functional block diagram of a doubly linked blockchain, according to an example embodiment.

Referring to FIG. 1B, a functional block diagram of a doubly linked blockchain 20, according to an example embodiment. Each block in the doubly linked blockchain 20 includes a block identifier, an internal hash tree, block content, a backward link that is a hash of the previous block, and a forward link that is a hash of the subsequent block. As will be appreciated, the doubly linked blockchain 20 may be generated based on an original, singly linked blockchain (e.g., the singly linked blockchain 10 of FIG. 1A). In some arrangements, the doubly linked blockchain 20 is generated using an instance of Abstract Syntax Notation One ("ASN. 1") type "SignedData" to generate a series of doubly linked signed data entries stored in a repository.

As shown in FIG. 1B, each block in the doubly linked blockchain 20 is denoted sequentially as β(a), β(b), β(c), and so on to β(z). The blockchain 20 has a genesis block, β(a), and a current (e.g., last) block, β(z). As will be appreciated and is illustrated below, any block in the middle of the blockchain 20 can be expressed as β(n), where its predecessor β(n−1) and its successor is β(n+1).

$$\beta(a) \leftrightarrow \beta(b) \leftrightarrow \beta(c) \ldots \beta(n-1) \leftrightarrow \beta(n) \leftrightarrow \beta(n+1) \ldots \beta(z)$$

The double arrows represent the forwards and backward links, which are the hashes of the subsequent and previous blocks, respectively. For example, the β(b) backward link to β(a) is the hash of β(a), denoted H(β(a)), and the β(b) forward link to β(c) is the hash of β(c), denoted H(β(c)). Because any block β(n) contains the hash of its previous block β(n−1) and of its subsequent block β(n+1), the data integrity of each block, and therefore the whole blockchain 20, can be validated. For example, the hash(b) within block β(a) is used as a forward link to block β(b). Once assembled, the blockchain 20 can be processed either forwards or backwards from any block in the blockchain 20. Any subsequent block added to the singly linked blockchain 10 requires a forward link to be appended to the penultimate block in the doubly linked blockchain 20. The appending or migration process does not affect hash integrity or a block's backward link, and chain immutability is preserved through the hashes in the previous and subsequent blocks. The appending process is expanded upon further below in reference to the generation of the doubly linked blockchain 20 in FIG. 2.

By way of example, the doubly linked blockchain 20 shown in FIG. 1B can be used to track a transaction throughout the singly linked blockchain 10. A trail of money being transferred between multiple parties is easier to track as each block—which may or may not include data relevant to the tracked transaction—includes a link to each of the previous and subsequent blocks. During a forensic analysis to link the relevant transactions, the doubly linked blockchain 20 removes the need to take the data in the singly linked blockchain 10, put it through a proprietary or specific processing method, and process the temporarily augmented data. As will be appreciated, conventional methods require the data to be augmented each time because the previously augmented data does not contain the new blocks added since the previous analysis. Thus, the doubly linked blockchain system allows for the data to be processed and analyzed from the start of the forensic analysis process as the blocks are already doubly linked.

Figure 2:
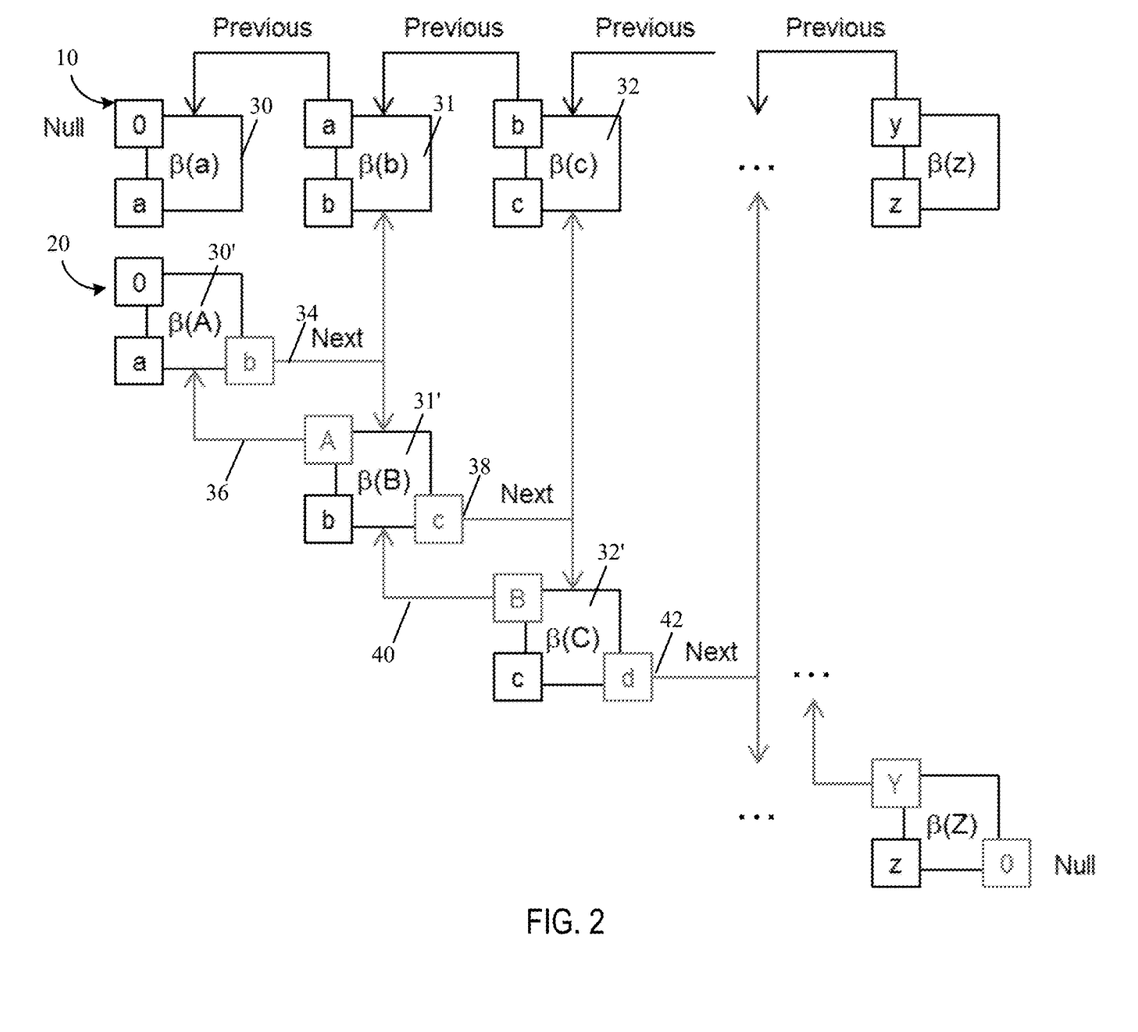
FIG. 2 is a functional block diagram of a doubly linked blockchain being generated from a singly linked blockchain, according to an example embodiment.

Referring now to FIG. 2, a functional block diagram of the doubly linked blockchain 20 of FIG. 1B being generated from the singly linked blockchain 10 of FIG. 1A is shown, according to an example embodiment. The doubly linked blockchain 20 is generated from the singly linked blockchain 10 in an iterative process that includes capturing data from the singly linked blockchain 10 (denoted with β(lowercase letters)) and generating the doubly linked blockchain 20 (denoted with β(uppercase letters)) by migrating the data and appending the double links onto the blocks. Generally, the generation of the doubly linked blockchain 20 includes appending links to blocks without changing the original block data so as to maintaining the validity of the hash values. For example, by adding previous link (a) to β(B), it changes β(B) so that the next link (b) in β(A) no longer links to β(B); updating the next link (b) in β(A) changes β(A) so the previous link (a) in β(B) no longer links to β(A); and updating the previous link (a) in β(B) changes β(B) so next link (b) in β(A) no longer links to β(B).

The doubly linked blockchain 20 is generated using an iterative process including copying the next block in the singly linked blockchain 10, appending a forward link, appending a prime (e.g., updated) backward link, and publishing the appended block onto the doubly linked blockchain 20. As shown in FIG. 2, the identified sequential three block cluster includes a genesis block β(a) 30, and two subsequent blocks, β(b) 31 and β(c) 32. Each block on the singly linked blockchain 10 comprises a backward link, an internal hash tree, and data. The backward link is a hash of the previous block (or null in the case of the genesis block β(a) 30). The internal hash tree is the hashes of the block data, denoted H(data) or H(a:data), H(b:data), and H(c:data). The data may be of any format or content.

The generation of the doubly linked blockchain 20 begins with copying the first block 30 from the singly linked blockchain. Before a first forward link 34 can be generated, the second block β(b) 31 is captured from the singly linked blockchain 10 and copied (although not yet published onto the doubly linked blockchain 20 as the second block β(b) 31 must still be appended with forward and backward links). A hash of the second block ("H(β(b))") is generated. A first prime block ("β(A)") 30' of the doubly linked blockchain 20 is generated by appending the genesis block β(a) is with a first forward link 34. The first forward link 34 comprises a hash of the second block H(β(b)) on the singly linked blockchain 10 and the first prime block β(A) 30' is published onto the doubly linked blockchain 20. The first prime block β(A) 30' on the doubly linked blockchain 20 is as follows:

$$\beta(A)=\beta(a)\|H(\beta(b))$$

As will be appreciated, the backward link in β(b) 31 of the singly linked blockchain 10 still uses H(β(a)) so that the regular blockchain validation remains unaffected. However, on the doubly linked blockchain 20 a first forward link 34 exists from β(A) 30' to the second block β(b) 31 of the singly linked blockchain 10 via a hash of the second block β(b) 31, H(β(b)).

Next, an intermediate second block β(b*) (not shown in FIG. 2) is generated by appending the second block β(b) 31 of the singly linked blockchain 10 with a first prime backward link 36. The first prime backward link 36 comprises a hash of the first prime block ("H(β(A))") of the doubly linked blockchain 20. The intermediate second block β(b*), including the first prime backward link 36 to β(A), is as follows:

$$\beta(b^*)=\beta(b)\|H(\beta(A))$$

A second forward link 38 is generated by computing a hash of the third block β(c) 32 of the singly linked blockchain 10. The intermediate second block β(b*) is appended with the second forward link 38 to generate the second prime block ("β(B)") 31'. The second prime block β(B) 31' is published onto the doubly linked blockchain 20. The second prime block β(B) 31' of the doubly linked blockchain 20 is as follows:

$$\beta(B)=\beta(b)\|H(\beta(A))\|H(\beta(c))$$

At the completion of generating the first prime block β(A) 30' and second prime block β(B) 31' on the parallel doubly linked blockchain 20, the doubly linked blockchain 20 is as follows:

$$(\text{null})\beta(A)\leftrightarrow\beta(B)\leftrightarrow\beta(c)\ldots$$

Next, an intermediate third block β(c*) (not shown in FIG. 2) is generated by appending the third block β(c) 32 of the singly linked blockchain 10 is with a second prime backward link 40. The second prime backward link 40 comprises a hash of the second prime block ("H(β(B))") on the doubly linked blockchain 20. The intermediate third block β(c*), including the second prime backward link 40 to β(B), is as follows:

$$\beta(e)=\beta(c)\|H(\beta(B))$$

A third forward link 42 is generated by computing a hash of the fourth block H(β(d)) of the singly linked blockchain 10 (not shown). The intermediate third block β(c*) is appended with the third forward link 42 to generate the third prime block ("β(C)") 32' of the doubly linked blockchain 20. The third prime block β(C) 32' is published onto the doubly linked blockchain 20. The third prime block β(C) 32' on the doubly linked blockchain 20 is as follows:

$$\beta(C)=\beta(c)\|H(\beta(B))\|(\beta(d))$$

At the completion of generating the third prime block β(C) 32' on the parallel doubly linked blockchain 20, the doubly linked blockchain 20 is as follows:

$$(\text{null})\beta(A)\leftrightarrow\beta(B)\leftrightarrow\beta(C)\leftrightarrow\beta(d)\ldots$$

This process continues until the doubly linked blockchain 20 comprises all the blocks on the singly linked blockchain 10, with each block on the doubly linked blockchain 20 doubly linked as follows:

$$\beta(A)\leftrightarrow\beta(B)\leftrightarrow\beta(C)\ldots\beta(z)$$

As will be appreciated, when the next block β(z+1) is published on the original blockchain, the previous block β(z) can be likewise appended into β(Z). During this process, the doubly linked blockchain 20 exists with the current block having only a backward link to its predecessor because its successor block does not yet exist on the singly linked blockchain 10.

In some arrangements, the new blocks on the doubly linked blockchain 20 can be digitally signed to add an additional layer of origin authenticity to the data. In those arrangements, the blocks on the doubly linked blockchain 20 are digitally signed before they are published to the doubly linked blockchain 20. In some arrangements, the SignedData cryptographic message syntax is used to generate a SignedData message that includes the doubly linked block as the content-to-be-signed along with any associated attributes. The associated attributes can include any details that the facilitator of the doubly linked blockchain 20 would like to authenticate and cryptographically bind to the content. In some arrangements, a time stamp token ("TST") may be requested from a time stamp authority ("TSA") and included in "attributes" of the SignedData message. For example, both a SAML assertion and the TST could be included in the SignedData UnsignedAttributes field, as well as cryptographically bound to the content.

As will be appreciated, the use of digital signatures can provide additional security and protection to the data in the blocks. For example, a new, stronger cryptographic signature may be used to add security to data in the singly linked blockchain 10 that was digitally signed using a weaker, compromised, or less effective digital signature. For example, in one implementation, an RSA 512-bit key was used to sign blocks β(a), β(b), and β(c). At a later point in time, a stronger key is preferred, such as a RSA 1024-bit key, and the singly linked blockchain 10 is used to generate a doubly linked blockchain 20. The original block is then "wrapped" with the RSA 1024-bit key. This includes using the old data, with the old signature and the old certificate, as the input for the new signature and new certificate. Alternatively, instead of including the entire signed block as the content in the SignedData message, a pointer to the block can be included in the digitally signed new block on the doubly linked blockchain 20. To validate, the new RSA 1024-bit key would be used to unwrap the first layer, and the old RSA 512-bit key would be used to unwrap the underlying content of the original first block.

In some arrangements, a doubly linked repository is generated instead of the doubly linked blockchain 20 described above. The doubly linked repository includes a series of data entries generated using the singly linked blockchain 10. Each of the series of data entries are doubly linked through digital signature attributes. Generally, the generation of the doubly linked repository using the singly linked blockchain 10 includes digitally signing each original block and using the signed content in a data message to store the prime backward link and forward link. This process effectively generates a doubly linked data message with the links easily accessible and stored in the content of the data message. These data messages are stored in a repository or blockchain. The digital signature message used to generate a doubly linked data message can be in the form used to sign an X.509 certificate/attributes or the SignedData message.

In some arrangements, the generation of the doubly linked repository using the singly linked blockchain 10 can include digitally signing each original block in the form used to sign an X.509 certificate. In such arrangements, the certificate is a "sequence" type containing a component that is the content-to-be-signed, the digital signature on the content-to-be-signed, and information indicating the signing party's public key, the digital signature algorithm used, and the new backward link and forward link. Additionally, X.509 has two Distinguished Names ("DN") in every certificate implemented as a set of attributes: one DN for the certificate subject and another DN for the certificate issuer. The X.509 DNs can be cryptographically bound by a digital signature of the certificate issuer.

In some arrangements, the generation of a doubly linked repository using the singly linked blockchain 10 can include digitally signing each original block in the form used to sign an X.509 attribute. The attributes can be used, for example, to identify a particular transaction type or entity, for example, a credit card service provider and can be tracked through the singly linked blockchain 10. For example, doubly linked signed blocks related to a funds transfer may be tracked throughout the blockchain and may include an attribute the forward and backward links for each block along the chain. In some arrangements, attributes that are protected under a digital signature on the content-to-be-signed may be included in a component of the digital signature. These signed attributes can serve the same function in an identity management context as "signed claims" or "signed assertions" provided using X.509 Attribute Certificates or XML Security Assertion Markup Language ("SAML") assertions. The X.509 extension mechanism in version 3 allows the X.509 to be extended by anyone with a need without requiring any change whatsoever to the X.509 standard. These "protocol holes" are a free form, open ended location that a user of the protocol can fill in with anything they need or that suits them. Each extension is a package containing an identifier of its content (e.g., the extension payload) and the extension content. The content may be of any type of data and of any kind or format.

Alternatively, the generation of the doubly linked repository using the singly linked blockchain 10 can include digitally signing each original block using the SignedData message. In these arrangements, the entire first block—including the original backward link, internal hash tree, and content—is the input into the SignedData message schema. The prime backward link and forward link is calculated for each block in a manner similar to that discussed above in relation to the generation of the doubly linked blockchain 20 in FIG. 2. In some arrangements, the SignedData message includes the prime backward link and forward link as an attribute, such that each generated message—one per each block—may be stored in any repository and the linkage to the previous and subsequent block maintained. This allows even greater searchability and functionality as the entity which implemented this SignedData doubly linked "blockchain" (e.g., repository) may structure it as any type of navigable data structure that is needed.

In some arrangements, the SignedData message doubly linked repository is generated recursively. This includes using the SignedData message with the input being entire first block including the original backward link, internal hash tree, and content. The prime backward link and forward link are calculated for each block in a manner similar to that discussed above in relation to the generation of the doubly linked blockchain 20 in FIG. 2. A set of "detached" data elements are generated, each associated with a given original block in the original blockchain. The detached content is such that the signature in the SignedData message is performed over the content-to-be-signed but is not included in the SignedData message, thereby being detached. However, the content-to-be-signed must be available when the SignedData signature is verified because the signature verification process requires computing the hash over the content-to-be-signed. This allows an application process to operate on cryptographic algorithm information while ignoring associated information security management attributes and to rely on another application process (e.g., a Web service to perform signature verification).

Figure 3:
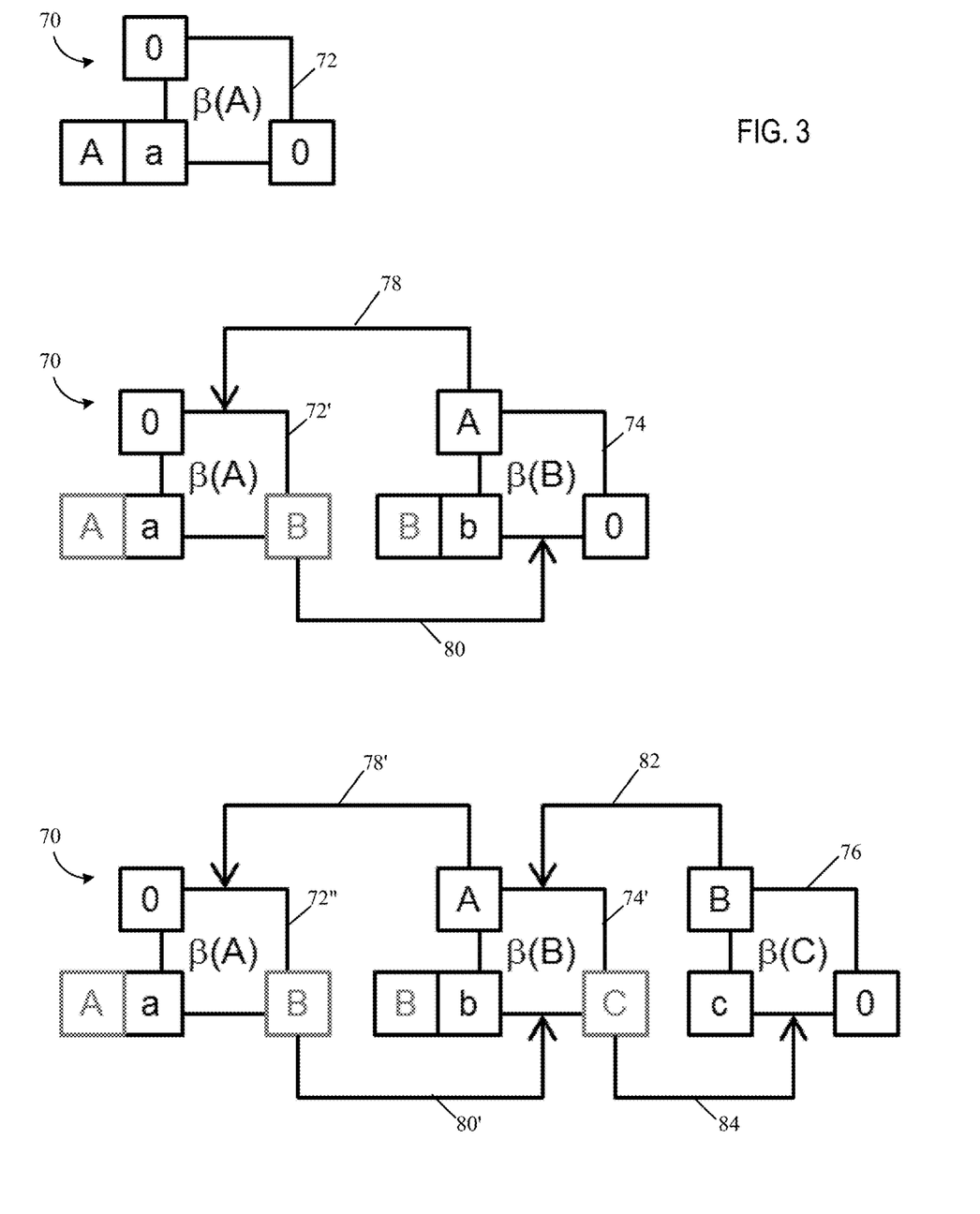
FIG. 3 is a functional block diagram of a doubly linked blockchain being generated from the onset, according to an example embodiment.

Referring now to FIG. 3, a functional block diagram of generating a doubly linked blockchain 70 from the onset (e.g., inception) is shown, according to an example embodiment. As will be appreciated, the generation of an onset doubly linked blockchain 70 does not require a singly linked blockchain as the data is initially and only published on the onset doubly linked blockchain 70. In some arrangements, a block is not published on the onset doubly linked blockchain 70 until a subsequent block is generated, thereby allowing the double links to be generated before the "older" block is published to the onset doubly linked blockchain 70. In other arrangements, and as described below, each block is temporarily published to the onset doubly linked blockchain 70 and then subsequently "updated" with the backward link and forward link. As will be appreciated, temporary publishing refers to the necessity to update the previous collection of blocks each time a new block is added to the onset doubly linked blockchain 70. The publishing is temporary until the forward and backward links and the hashes for the previous blocks have been updated, such that the block will no longer need to be updated, at which point the block is "permanently" published to the onset doubly linked blockchain 70. In both arrangements, a trusted authority may be necessary to provide immutability to the degree found in a conventional blockchain.

The generation of the onset doubly linked blockchain 70 begins with a first block 72 (e.g., genesis block) being temporarily published to the onset doubly linked blockchain 70. The first block β(A) 72 contains a backward link to null, a forward link to null (no subsequent block exists yet), an internal hash tree, and data. The publishing of the first block 72 is temporary because a first forward link still needs to be generated and subsequently updated when the second block 74 is updated. Next, a second block β(B) 74 is temporarily published to the onset doubly linked blockchain 70. The second block β(B) 74 comprises a first backward link 78, an internal hash tree, a forward link to null (no subsequent block exists), and data. The null forward link in the first block is replaced with a first forward link 80 to generate a first prime block 72'. The first forward link 80 comprises a hash of the next block H(β(B)). The hash(a) remains unchanged while the hash(A) is updated in the first prime block 72'. At the completion of the generation of the first prime block 72' the doubly linked blockchain is as follows:

$$\beta(A)=\beta(a)\|H(\beta(b))$$

$$\beta(B)=\beta(b)\|H(\beta(A))$$

$$(\text{null})\beta(A)\leftrightarrow\beta(B)$$

A third block β(C) 76 is temporarily published to the onset doubly linked blockchain 70. The third block β(C) 76 comprises a second backward link 82, an internal hash tree, a forward link to null (no subsequent block exists), and data. The null forward link in the second block is replaced with a second forward link 84 to generate a second prime block 74'. The second forward link 84 comprises a hash of the next block H(β(C)). The first prime block 72' needs to be updated to capture the changes to the second prime block 74'. Accordingly, the first forward link 80 is updated to generate a first prime forward link 80'. The first prime forward link 80' comprises a hash of the updated next block H(β(B)) 74'. The hash(a) and the hash(b) remain unchanged while the hash(A) and hash(B) are updated in the first double prime block 72" and the second prime block 74', respectively. At the completion of the generation of the second prime block 74' and the first double prime block 72", the doubly linked blockchain is as follows:

$$\beta(A)=\beta(a)\|H(\beta(b))$$

$$\beta(B)=\beta(b)\|H(\beta(A))$$

$$\beta(B)=\beta(b)\|H(\beta(A))\|H(\beta(c))$$

$$(\text{null})\beta(A)\leftrightarrow\beta(B)\leftrightarrow\beta(C)\ldots$$

When the next block is published β(z+1) on the doubly linked blockchain, the previous block β(z) can be likewise updated to β(Z), and the doubly linked blockchain exists with the current block having only a backward link to its predecessor since its successor block does not yet exist.

In some arrangements, the onset doubly linked blockchain 70 is accomplished with forward links that are to a location of the new digitally signed block (e.g., as a URL). In those arrangements, the URL can be added a block and signed before the next, new block exists. Once the next block exists, it is stored in the URL or location identified and is accessible (and linked) through the forward link. By having the forward pointer to a location that will eventually store the next block, allows for the forward link to be digitally signed without worrying about corrupting the signature with a change to the location, as the URL will not change, just the content stored at the URL.

Figure 4:
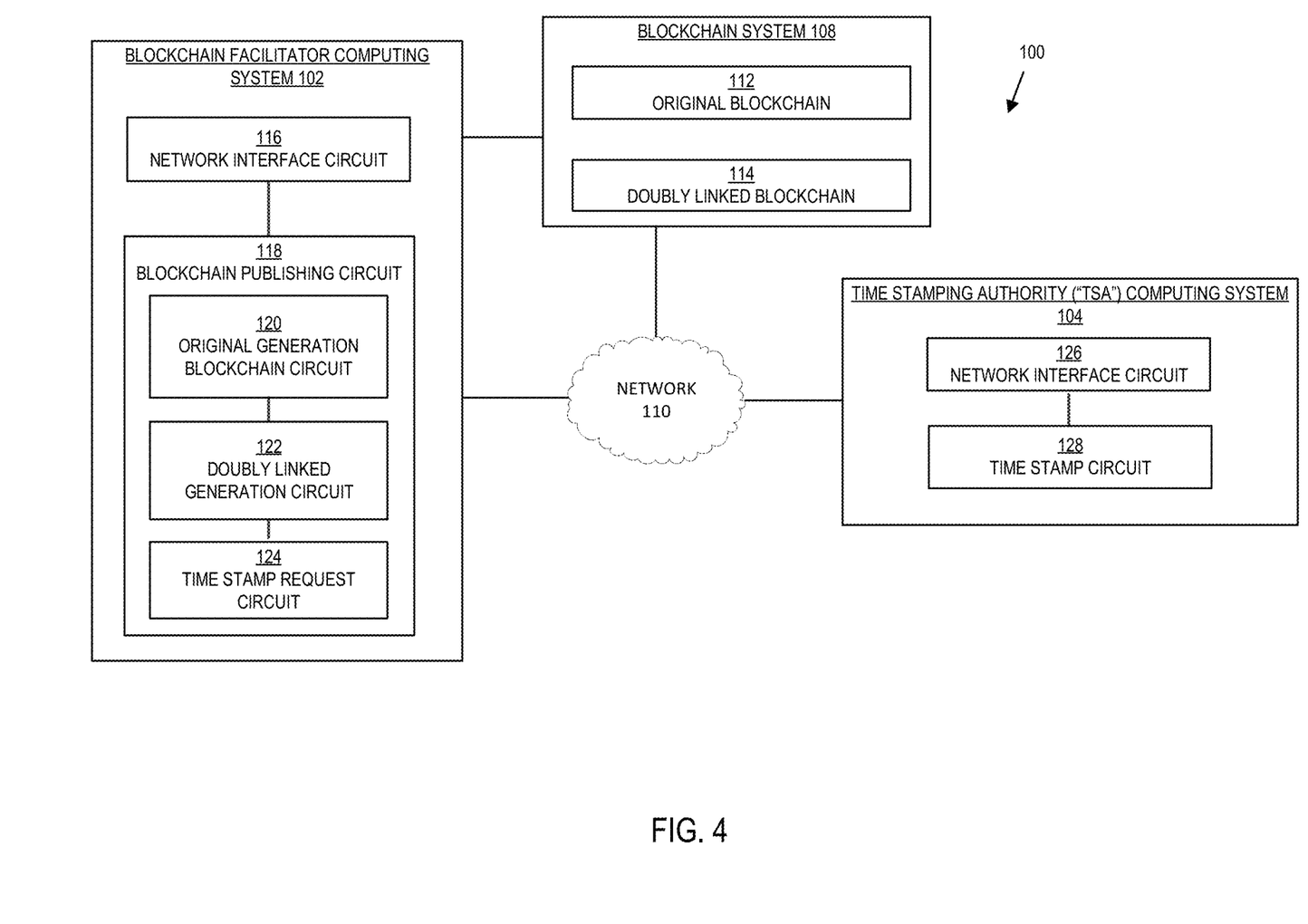
FIG. 4 is a schematic diagram of a doubly linked blockchain system, according to an example embodiment.

Turning to FIG. 4, a schematic diagram of a doubly linked blockchain system 100 is shown, according to an example embodiment. The doubly linked blockchain system 100 includes a blockchain facilitator computing system 102, a TSA computing system 104, and a blockchain system 108 managed by the blockchain facilitator computing system 102. Each of the blockchain facilitator computing system 102, the blockchain system 108, and the TSA computing system 104 is in operative communication with the others via a network 110. The network 110 may include, for example, the Internet, cellular networks, proprietary cloud networks, and the like. The doubly linked blockchain system 100 allows for the migration and generation of doubly linked blocks. For example, the doubly linked blockchain system 100 may be used to generate the doubly linked blockchain 20 of FIG. 1B or FIG. 2 or the onset doubly linked blockchain 70 of FIG. 3.

The blockchain system 108 comprises a singly linked blockchain 112 (e.g., the singly linked blockchain 100 of FIG. 1A) and a doubly linked blockchain 114 (e.g., the doubly linked blockchain 20 of FIGS. 1B & 2 or the onset doubly linked blockchain 70 of FIG. 3). The singly linked blockchain 112 contains a plurality of data objects or data structures that are cryptographically protected in order to secure the sensitive data. Each block in the singly linked blockchain 112 has a first unique block identifier. In some arrangements, the singly linked blockchain 112 may include data related to financial institutions, financial instruments, biometric data, or other sensitive data elements. The data elements may be related to one or more entities. For example, the singly linked blockchain 112 may include transaction information for a plurality of financial institutions. To protect these data elements, the primary blockchain may implement one or more cryptographic algorithms or various versions of the cryptographic algorithm(s). The cryptographic algorithms can include hash algorithms, digital signatures, modes, initialization factors, tokenization algorithm, key names, and the like. For example, an RSA may presently support RSA SHA-1 and RSA signatures with only SHA-256 in the present. In the future, the RSA may not support RSA signatures at all but may support elliptic curve signatures with SHA. In some arrangements, the singly linked blockchain 112 includes one or more links to an associated doubly linked block on the doubly linked blockchain 114 that signifies a cryptographic algorithm transition at that point in the singly linked blockchain 112. In such arrangements, an entity may easily determine a cryptographic algorithm transition by searching for these links on the singly linked blockchain 112.

The doubly linked blockchain 114 includes a plurality of doubly linked blocks. The doubly linked blocks can be similar to the doubly linked blockchain 20 generated in FIGS. 1B & 2 or the onset doubly linked blockchain 70 of FIG. 3. The doubly linked blockchain 114 can include doubly linked blocks that are: (1) doubly linked under a digital signature; (2) stored outside of the doubly linked blockchain 114 in a repository; (3) links between one or more interactions throughout an original blockchain; or (4) tailored to the needs of the blockchain facilitator in other ways. Due to the doubly linked blocks, the doubly linked blockchain 114 enables a more efficient "scan" of the doubly linked blockchain 114 to analyze the data in the blocks or to locate/track data within one or more blocks. As will be appreciated, this allows for efficient and effective retrieval of the information in the blocks.

The blockchain facilitator computing system 102 includes a network interface circuit 116 and a blockchain publishing circuit 118. The network interface circuit 116 is structured to facilitate operative communication between the blockchain facilitator computing system 102 and other systems and devices over the network 110. The blockchain publishing circuit 118 includes an original blockchain generation circuit 120, a doubly linked block generation circuit 122, and a time stamp request circuit 124. The original blockchain generation circuit 120 is structured to determine what cryptographic algorithms should be used to process and protect the data, determine if a TST needs to be negotiated, and ultimately publish the data on the singly linked blockchain 112 in the correct format. The blockchain publishing circuit 118 receives data elements from the blockchain facilitator computing system 102 as they are generated. In some arrangements, the singly linked blockchain 112 is generated and maintained by an entity separate from the entity that managed the blockchain facilitator computing system 102, in those arrangements the blockchain facilitator computing system 102 does not include the original blockchain generation circuit 120.

The doubly linked block generation circuit 122 is structured to facilitate migration of the singly linked blocks on the singly linked blockchain 112 to doubly linked blocks on the doubly linked blockchain 114. This includes identifying the blocks on the singly linked blockchain 112, generating a new backward link, generating a new forward link, and publishing the new doubly linked block to the doubly linked blockchain 114. The doubly linked blocks can be generated similar to the doubly linked blockchain 20 generated in FIGS. 1B & 2 or the onset doubly linked blockchain 70 of FIG. 3. In some arrangements, the doubly linked block generation circuit 122 is also structured to facilitate the retrieval of doubly linked data elements or doubly linked blocks on the doubly linked blockchain 114.

The time stamp request circuit 124 is structured to negotiate a TST with the TSA computing system 104 for the doubly linked blocks in the doubly linked blockchain 114 or the data elements on the singly linked blockchain 112. The time stamp request circuit 124 submits a time stamp request including a hash of the information (e.g., the doubly linked block or the data elements/block on the singly linked blockchain 112) to the TSA computing system 104. The time stamp request contains a hash value (e.g., the hash of the information), the time stamp (e.g., time of generation), and a cryptographic binding (e.g. cryptography). The TSA computing system 104 returns a response containing the TST to the time stamp request circuit 124 of the blockchain facilitator computing system 102. The TST provides evidence that the digital data existed at the time indicated by the time stamp.

The TSA computing system 104 includes a network interface circuit 126 and a time stamp circuit 128. The TSA computing system 104 is managed by any trusted time authority that can provide a TST for a piece of information or data entry. The trusted time authority can be one that complies with the X9.95 standard, or those defined in similar standards by ISO/IEC, and satisfies legal and regulatory requirements. In some arrangements, the TSA computing system 104 may be contained in, and controlled by, the blockchain facilitator computing system 102. The network interface circuit 126 is structured to facilitate operative communication between the TSA computing system 104, the blockchain facilitator computing system 102, and the blockchain system 108 over the network 110. The time stamp circuit 128 is structured to negotiate a trusted TST, which includes receiving a hash of a piece of information and generating a trusted TST for the information for future verification. In some arrangements, the TST is stored as an attribute in the doubly linked block.

The arrangements described herein have been described with reference to drawings. The drawings illustrate certain details of specific arrangements that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
    accessing, by a computing system, a first block of a first blockchain, the first block comprising first block content;
    generating, by the computing system, an intermediate first block, the intermediate first block comprising:
        the first block of the first blockchain, wherein the generation of the intermediate first block does not alter the first block of the first blockchain;
    accessing, by the computing system, a second block of the first blockchain, the second block comprising:
        a first backward link comprising a hash of the first block of the first blockchain, and
        second block content;
    generating, by the computing system, a first forward link comprising a hash of the second block of the first blockchain;
    generating, by the computing system, a first prime block, the first prime block comprising:
        the intermediate first block, and
        the first forward link,
        wherein the generation of the first prime block does not alter the first block of the first blockchain;
    publishing, by the computing system, the first prime block on a doubly linked blockchain separate from and generated in parallel with the first blockchain, wherein publishing the first prime block on the doubly linked blockchain does not alter the first block of the first blockchain; and
    digitally signing, by the computing system, the first block using SignedData cryptographic message syntax to generate a first SignedData message,
    wherein digitally signing comprises binding, by the computing system, the first forward link to the first SignedData message via an attribute of the first SignedData message.

2. The method of claim 1, further comprising:
    generating, by the computing system, an intermediate second block, the intermediate second block comprising:
        the second block of the first blockchain, and
        a first prime backward link comprising a hash of the first prime block,
            wherein the generation of the intermediate second block does not alter the second block content of the first blockchain;
    accessing, by the computing system, a third block of the first blockchain, the third block comprising:
        a second backward link comprising a hash of the second block of the first blockchain, and
        third block content;
    generating, by the computing system, a second forward link comprising a hash of the third block of the first blockchain;

generating, by the computing system, a second prime block, the second prime block comprising:
  the intermediate second block, and
  the second forward link,
    wherein the generation of the second prime block does not alter the second block content of the first blockchain; and
digitally signing, by the computing system, the second block of the first blockchain using SignedData cryptographic message syntax to generate a second SignedData message,
  wherein digitally signing comprises binding, by the computing system, the second forward link and the first prime backward link via an attribute of the second SignedData message.

3. The method of claim 2, further comprising:
generating, by the computing system, an intermediate third block, the intermediate third block comprising:
  the third block of the first blockchain, and
  a second prime backward link comprising a hash of the second prime block;
accessing, by the computing system, a fourth block of the first blockchain, the fourth block comprising:
  a third backward link comprising a hash of the third block of the first blockchain, and
  fourth block content;
generating, by the computing system, a third forward link comprising a hash of the fourth block of the first blockchain; and
digitally signing, by the computing system, the third block of the first blockchain using SignedData cryptographic message syntax to generate a third SignedData message,
  wherein digitally signing comprises binding, by the computing system, the third forward link and the second prime backward link via an attribute of the third SignedData message.

4. The method of claim 2, further comprising publishing, by the computing system, the second prime block on a doubly linked blockchain,
  wherein the second prime block is published after the second prime block comprises both the first prime backward link and the second forward link, and
  wherein neither the generation nor the publication on the doubly linked blockchain of the second prime block alters the first blockchain.

5. The method of claim 1, further comprising:
generating, by the computing system, a hash on the first block; and
retrieving, by the computing system, a time stamp token, the time stamp token comprising a hash cryptographically bound to a time stamp,
  wherein the time stamp token is subsequently validated by verifying that the time stamp token was generated using the hash.

6. The method of claim 1, wherein digitally signing the first block further comprises:
binding, by the computing system, a time stamp token to the first SignedData message via an attribute of the first SignedData message.

7. The method of claim 1,
  wherein the first prime block is published after the first prime block comprises the first forward link, and
  wherein neither the generation nor the publication on the doubly linked blockchain of the first prime block alters the first blockchain.

8. A system of generating a doubly linked blockchain, comprising:
a processor; and
a non-transitory machine-readable medium with instructions stored thereon that, when executed by the processor, cause the system to:
  access a first block of a first blockchain, the first block comprising first block content;
  generate an intermediate first block, the intermediate first block comprising:
    the first block of the first blockchain, wherein the generation of the intermediate first block does not alter the first block of the first blockchain;
  access a second block of the first blockchain, the second block comprising:
    a first backward link comprising a hash of the first block of the first blockchain, and
    second block content;
  generate a first forward link comprising a hash of the second block of the first blockchain;
  generate a first prime block, the first prime block comprising:
    the intermediate first block, and
    the first forward link,
    wherein the generation of the first prime block does not alter the first block of the first blockchain;
  publish the first prime block on a doubly linked blockchain separate from and generated in parallel with the first blockchain, wherein publishing the first prime block on the doubly linked blockchain does not alter the first block of the first blockchain; and
  digitally sign the first block using SignedData cryptographic message syntax to generate a first SignedData message,
    wherein digitally signing comprises binding the first forward link to the first SignedData message via an attribute of the first SignedData message.

9. The system of claim 8, wherein the instructions further cause the system to:
generate an intermediate second block, the intermediate second block comprising:
  the second block of the first blockchain, and
  a first prime backward link comprising a hash of the first prime block,
    wherein the generation of the intermediate second block does not alter the second block content of the first blockchain;
access a third block of the first blockchain, the third block comprising:
  a second backward link comprising a hash of the second block of the first blockchain, and
  third block content;
generate a second forward link comprising a hash of the third block of the first blockchain;
generate a second prime block, the second prime block comprising:
  the intermediate second block, and
  the second forward link,
    wherein the generation of the second prime block does not alter the second block content of the first blockchain; and
digitally sign the second block of the first blockchain using SignedData cryptographic message syntax to generate a second SignedData message,
  wherein digitally signing comprises binding the second forward link and the first prime backward link via an attribute of the second SignedData message.

10. The system of claim 9, wherein the instructions further cause the system to:
- generate an intermediate third block, the intermediate third block comprising:
  - the third block of the first blockchain, and
  - a second prime backward link comprising a hash of the second prime block;
- access a fourth block of the first blockchain, the fourth block comprising:
  - a third backward link comprising a hash of the third block of the first blockchain, and
  - fourth block content;
- generate a third forward link comprising a hash of the fourth block of the first blockchain; and
- digitally sign the third block of the first blockchain using SignedData cryptographic message syntax to generate a third SignedData message,
  - wherein digitally signing comprises binding the third forward link and the second prime backward link via an attribute of the third SignedData message.

11. The system of claim 9, wherein the instructions further cause the system to publish the second prime block on the doubly linked blockchain,
- wherein the second prime block is published after the second prime block comprises both the first prime backward link and the second forward link, and
- wherein neither the generation nor the publication on the doubly linked blockchain of the second prime block alters the first blockchain.

12. The system of claim 8, wherein the instructions further cause the system to:
- generate a hash on the first block; and
- retrieve a time stamp token, the time stamp token comprising a hash cryptographically bound to a time stamp, wherein the time stamp token is subsequently validated by verifying that the time stamp token was generated using the hash.

13. The system of claim 8, wherein digitally signing the first block further comprises:
- binding a time stamp token to the first SignedData message via an attribute of the first SignedData message.

14. The system of claim 8,
- wherein the first prime block is published after the first prime block comprises the first forward link, and
- wherein neither the generation nor the publication on the doubly linked blockchain of the first prime block alters the first blockchain.

15. A non-transitory computer-readable medium having computer-executable instructions embodied therein that, when executed by a computing system, cause the computing system to perform operations for generating a doubly linked blockchain, the operations comprising:
- accessing a first block of a first blockchain, the first block comprising first block content;
- generating an intermediate first block, the intermediate first block comprising:
  - the first block of the first blockchain, wherein the generation of the intermediate first block does not alter the first block of the first blockchain;
- accessing a second block of the first blockchain, the second block comprising:
  - a first backward link comprising a hash of the first block of the first blockchain, and
  - second block content;
- generating a first forward link comprising a hash of the second block of the first blockchain;
- generating a first prime block, the first prime block comprising:
  - the intermediate first block, and
  - the first forward link,
  - wherein the generation of the first prime block does not alter the first block of the first blockchain;
- publishing the first prime block on the doubly linked blockchain separate from and generated in parallel with the first blockchain, wherein publishing the first prime block on the doubly linked blockchain does not alter the first block of the first blockchain; and
- digitally signing the first block using SignedData cryptographic message syntax to generate a first SignedData message,
- wherein digitally signing comprises binding the first forward link to the first SignedData message via an attribute of the first SignedData message.

16. The computer-readable medium of claim 15, the operations further comprising:
- generating an intermediate second block, the intermediate second block comprising:
  - the second block of the first blockchain, and
  - a first prime backward link comprising a hash of the first prime block,
  - wherein the generation of the intermediate second block does not alter the second block content of the first blockchain;
- accessing a third block of the first blockchain, the third block comprising:
  - a second backward link comprising a hash of the second block of the first blockchain, and
  - third block content;
- generating a second forward link comprising a hash of the third block of the first blockchain;
- generating a second prime block, the second prime block comprising:
  - the intermediate second block, and
  - the second forward link,
  - wherein the generation of the second prime block does not alter the second block content of the first blockchain; and
- digitally signing the second block of the first blockchain using SignedData cryptographic message syntax to generate a second SignedData message,
  - wherein digitally signing comprises binding the second forward link and the first prime backward link via an attribute of the second SignedData message.

17. The computer-readable medium of claim 16, the operations further comprising:
- generating an intermediate third block, the intermediate third block comprising:
  - the third block of the first blockchain, and
  - a second prime backward link comprising a hash of the second prime block;
- accessing a fourth block of the first blockchain, the fourth block comprising:
  - a third backward link comprising a hash of the third block of the first blockchain, and
  - fourth block content;
- generating a third forward link comprising a hash of the fourth block of the first blockchain; and
- digitally signing the third block of the first blockchain using SignedData cryptographic message syntax to generate a third SignedData message,
  - wherein digitally signing comprises binding the third forward link and the second prime backward link via an attribute of the third SignedData message.

18. The computer-readable medium of claim 16, the operations further comprising publishing the second prime block on the doubly linked blockchain,
- wherein the second prime block is published after the second prime block comprises both the first prime backward link and the second forward link, and
- wherein neither the generation nor the publication on the doubly linked blockchain of the second prime block alters the first blockchain.

19. The computer-readable medium of claim 15, the operations further comprising:
- generating a hash on the first block; and
- retrieving a time stamp token, the time stamp token comprising a hash cryptographically bound to a time stamp,
  - wherein the time stamp token is subsequently validated by verifying that the time stamp token was generated using the hash.

20. The computer-readable medium of claim 15,
- wherein the first prime block is published after the first prime block comprises the first forward link, and
- wherein neither the generation nor the publication on the doubly linked blockchain of the first prime block alters the first blockchain.

\* \* \* \* \*